United States Patent [19]

Frankowski

[11] Patent Number: 5,062,356
[45] Date of Patent: Nov. 5, 1991

[54] COOKIE BAKING APPARATUS

[76] Inventor: Armella Frankowski, 18911 Townline Rd., Mokena, Ill. 60448

[21] Appl. No.: 610,161

[22] Filed: Nov. 5, 1990

[51] Int. Cl.$^5$ .......................... A22C 7/00; A23P 1/00
[52] U.S. Cl. ........................................ 99/428; 99/426; 99/439; 30/316; 249/122; 249/144; 249/DIG. 1
[58] Field of Search ................. 99/426, 428, 439, 430, 99/442, 353; 33/1 G; 434/430; 30/301, 302, 315, 316; 249/DIG. 1, 119, 122, 144, 155

[56] References Cited

U.S. PATENT DOCUMENTS

| 144,939 | 11/1873 | Wingate | 99/439 |
| 2,015,097 | 9/1935 | Bowman | 99/428 |
| 3,060,494 | 10/1962 | Noble | 99/426 |
| 4,452,419 | 6/1984 | Saleeba | 99/428 |
| 4,896,427 | 1/1990 | Smith | 33/1 G |

Primary Examiner—Harvey C. Hornsby
Assistant Examiner—Terrence R. Till
Attorney, Agent, or Firm—Leon Gilden

[57] ABSTRACT

An apparatus wherein a pan member includes a perimeter rim and a matrix of variously configured cookie mold members, with an upper cutting edge mounted on the pan member. The pan includes securement loops mounted on the floor of the pan to permit vertical storage of the pan against a wall and the like, with the various molds in a protected orientation within the perimeter flange when against a vertical wall surface. Modifications of the invention include selectively removable mold members formed with a magnetic base for securement to the pan floor. A further modification of the invention includes an upper mold member mounted with a lower mold member when positioning a dough portion therebetween, wherein the upper mold member is directed in a complementary manner to the lower pan and effects severing of the dough defining a first cookie portion and a second cookie portion formed by interaction of the mold member relative to the pan.

1 Claim, 4 Drawing Sheets

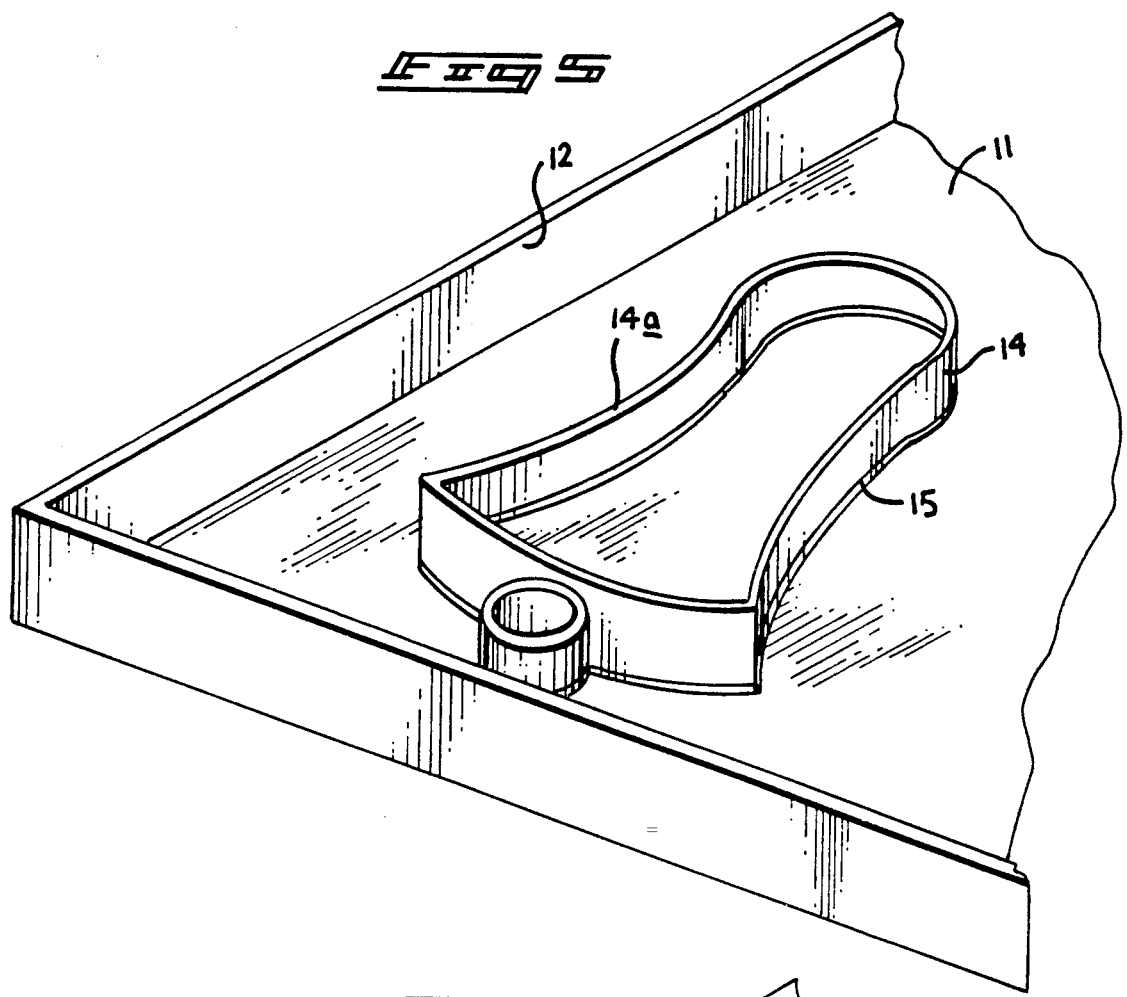
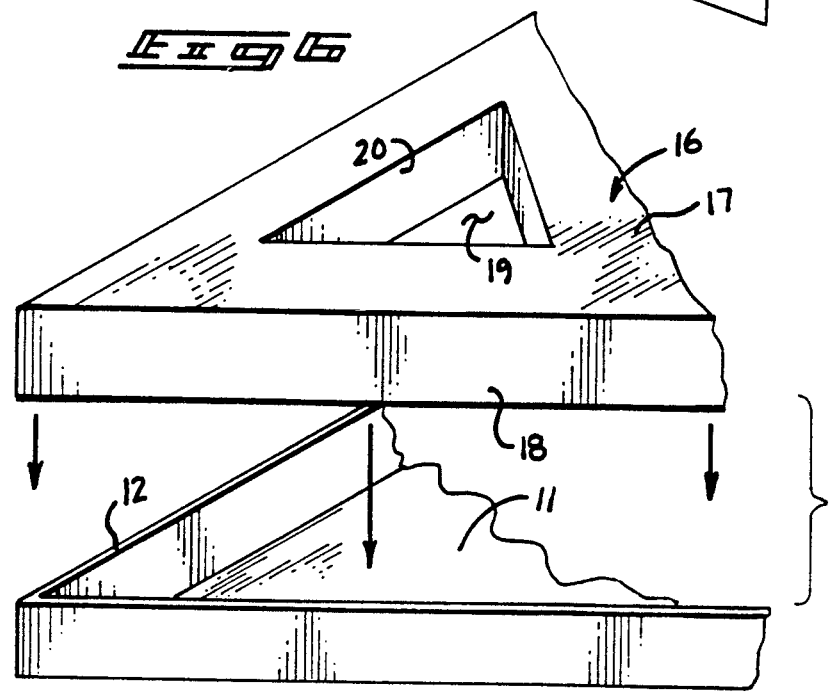

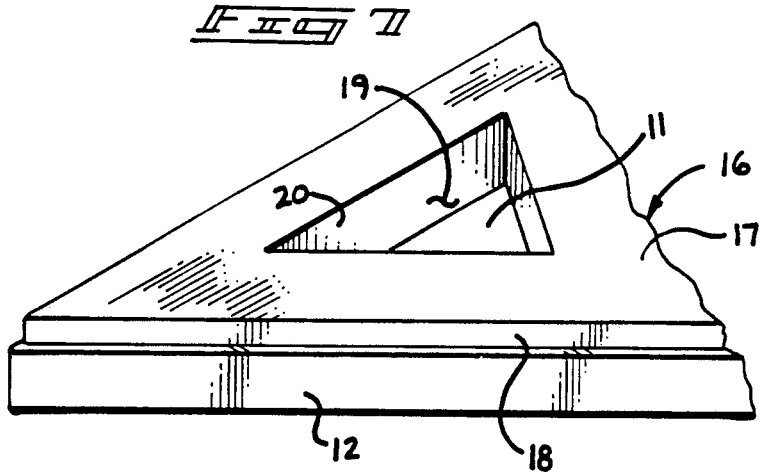
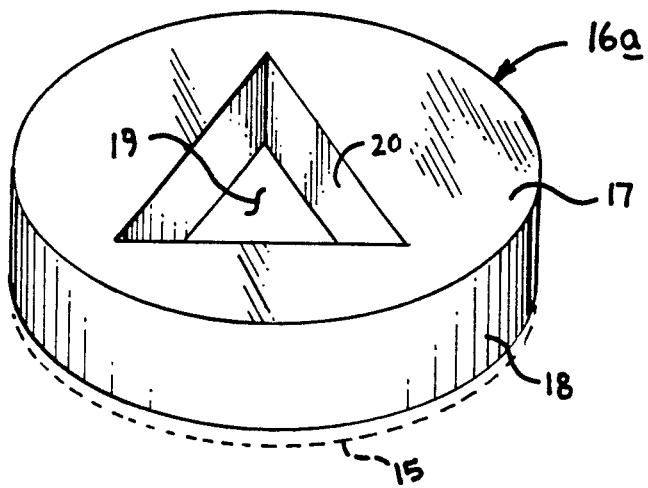
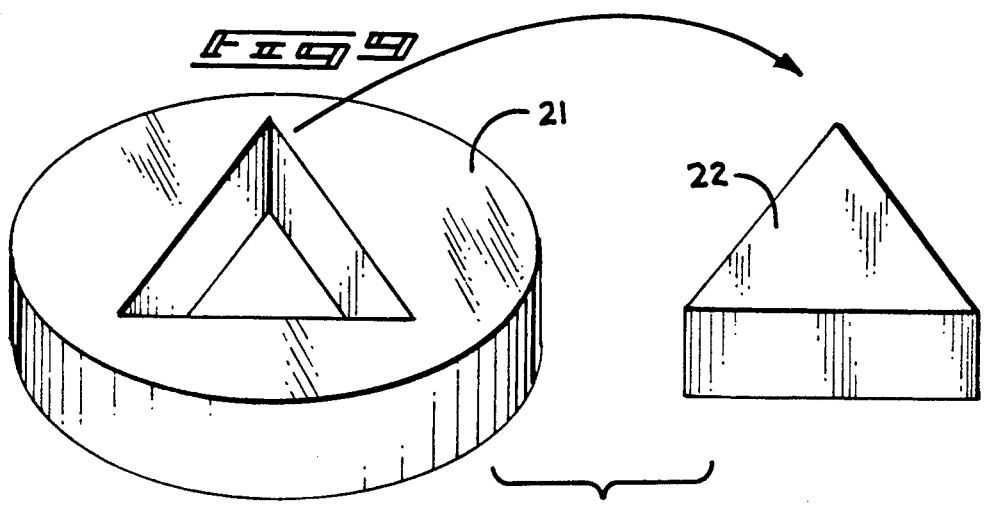

COOKIE BAKING APPARATUS

BACKGROUND OF THE INVENTION

1. Field of the Invention

The field of invention relates to cookie baking apparatus, and more particularly pertains to a new and improved cookie baking apparatus wherein the same permits ease of severing of various cookie shapes from an underlying dough portion mounted within a pan portion of the organization.

2. Description of the Prior Art

Various apparatus has been provided in the prior art to provide ease of formation of cookies to enhance speed and enjoyment of the cookie forming process by individuals. Examples of prior art dough shaping apparatus may be found in U.S. Pat. No. 2,493,854 to Brainard wherein the apparatus sets forth various mold members mounted within a pan member, whereupon the rolling of a dough roller and the like overlying the pan when dough is positioned therewithin severs various cookies from the pan member for use in a subsequent baking procedure.

U.S. Pat. No. 4,445,320 to Syrmis sets forth a sculpturing for chocolate candy and the like by adapting a photographic image of an individual's face and converted the adapted image into a transfer medium or die and embossing the image onto a chocolate candy.

U.S. Pat. No. 4,024,287 to Golchert sets forth a food decorating process wherein a transfer medium directs an edible ink onto a food product.

U.S. Pat. No. 4,058,892 to Adanko sets forth a food decorating tool arranged for cutting pieces of fruit and vegetables into predetermined patterns and configurations.

U.S. Pat. No. 4,452,419 to Saleeba sets forth a modular cake pan wherein various inserts are arranged for reception within the cake pan within predetermined positions within the pan for providing preselected shapes in a baking procedure.

As such, it may be appreciated that there continues to be a need for a new and improved cookie baking apparatus as set forth by the instant invention which addresses both the problems of ease of use as well as effectiveness in construction in providing various cookie shapes for baking and in this respect, the present invention substantially fulfills this need.

SUMMARY OF THE INVENTION

In view of the foregoing disadvantages inherent in the known types of cookie baking apparatus now present in the prior art, the present invention provides a cookie baking apparatus wherein the same provides for holding of cookie shapes within an underlying pan structure utilizing mold member cooperative with the pan structure. As such, the general purpose of the present invention, which will be described subsequently in greater detail, is to provide a new and improved cookie baking apparatus which has all the advantages of the prior art cookie baking apparatus and none of the disadvantages.

To attain this, the present invention provides an apparatus wherein a pan member includes a perimeter rim and a matrix of variously configured cookie mold members, with an upper cutting edge mounted on the pan member. The pan includes securement loops mounted on the floor of the pan to permit vertical storage of the pan against a wall and the like, with the various molds in a protected orientation within the perimeter flange when against a vertical wall surface. Modifications of the invention includes selectively removable mold members formed with a magnetic base for securement to the pan floor. A further modification of the invention includes an upper mold member mounted with a lower mold member when positioning a dough portion therebetween, wherein the upper mold member is directed in a complementary manner to the lower pan and effects severing of the dough defining a first cookie portion and a second cookie portion formed by interaction of the mold member relative to the pan.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cookie baking apparatus which has all the advantages of the prior art cookie baking apparatus and none of the disadvantages.

It is another object of the present invention to provide a new and improved cookie baking apparatus which may be easily and efficiently manufactured and marketed.

It is a further object of the present invention to provide a new and improved cookie baking apparatus which is of a durable and reliable construction.

An even further object of the present invention is to provide a new and improved cookie baking apparatus which is susceptible of a low cost of manufacture with regard to both materials and labor, and which accordingly is then susceptible of low prices of sale to the consuming public, thereby making such cookie baking apparatus economically available to the buying public.

Still yet another object of the present invention is to provide a new and improved cookie baking apparatus which provides in the apparatuses and methods of the prior art some of the advantages thereof, while simultaneously overcoming some of the disadvantages normally associated therewith.

Still another object of the present invention is to provide a new and improved cookie baking apparatus wherein the same permits for the multiple severing of a plurality of cookies from a single mold of a matrix of molds directed into an underlying pan.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric illustration of an individual cookie mold member mounted within an underlying pan.

FIG. 6 is a modification of the instant invention utilizing various mold members cooperative with an underlying pan.

FIG. 7 is an isometric illustration of the instant invention illustrating the upper mold member mounted and directed into the underlying pan structure.

FIG. 8 is an isometric illustration of a further example of a cookie mold member utilized by the instant invention.

FIG. 9 is an isometric illustration of a first and second cookie member formed by the mold member, as exemplified in FIG. 8.

DESCRIPTION OF THE PREFERRED EMBODIMENT

Figure 1:
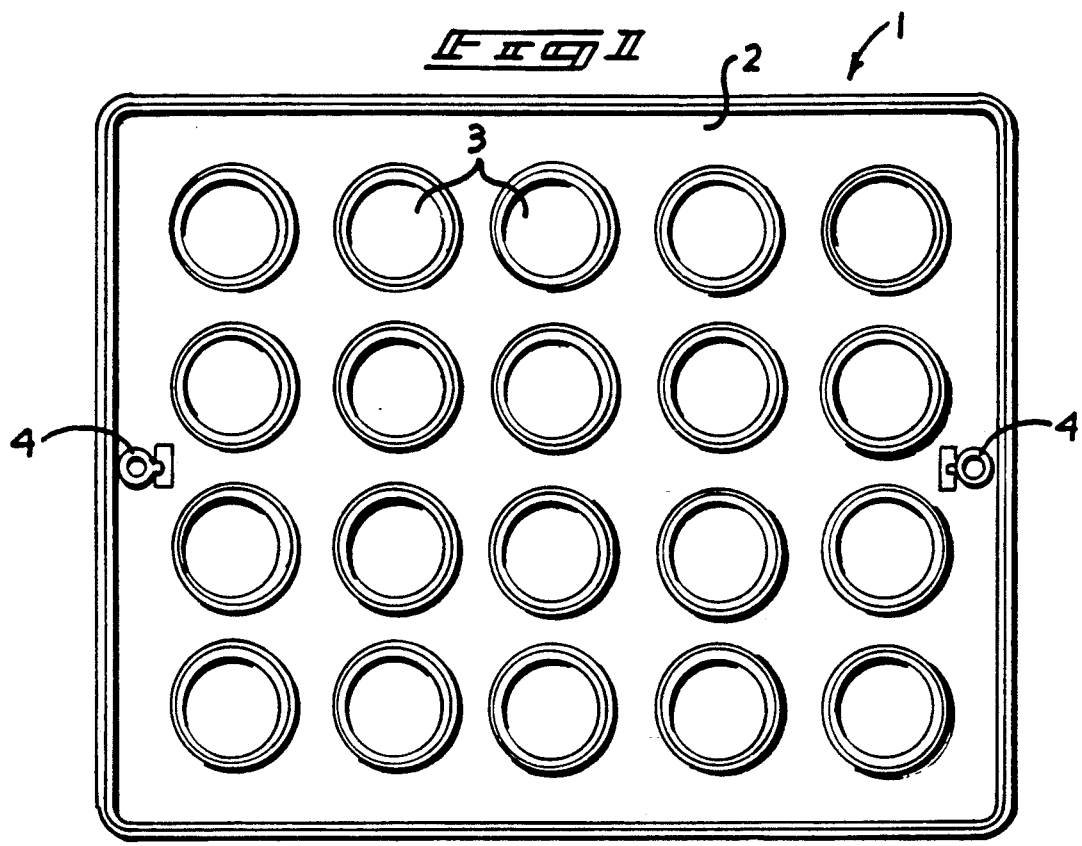
FIG. 1 is an orthographic top view of a prior art cookie mold organization.

With reference now to the drawings, and in particular to FIGS. 1 to 9 thereof, a new and improved cookie baking apparatus embodying the principles and concepts of the present invention and generally designated by the reference numeral 10 will be described.

Figure 2:
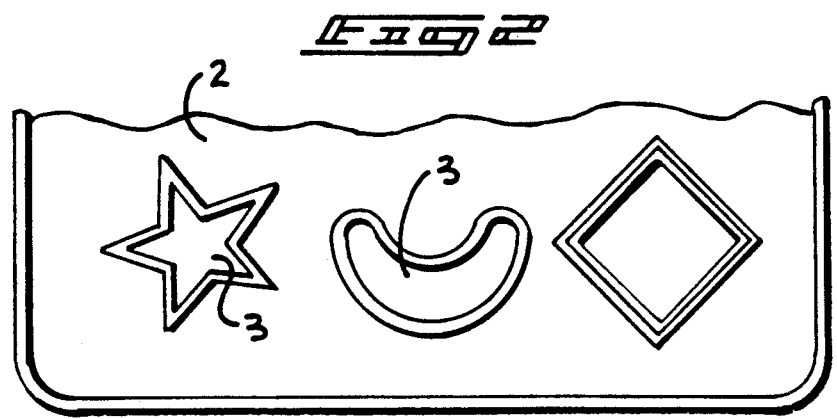
FIG. 2 is a top orthographic view of various shapes utilized by the prior art structure as set forth in FIG. 1.
Figure 3:
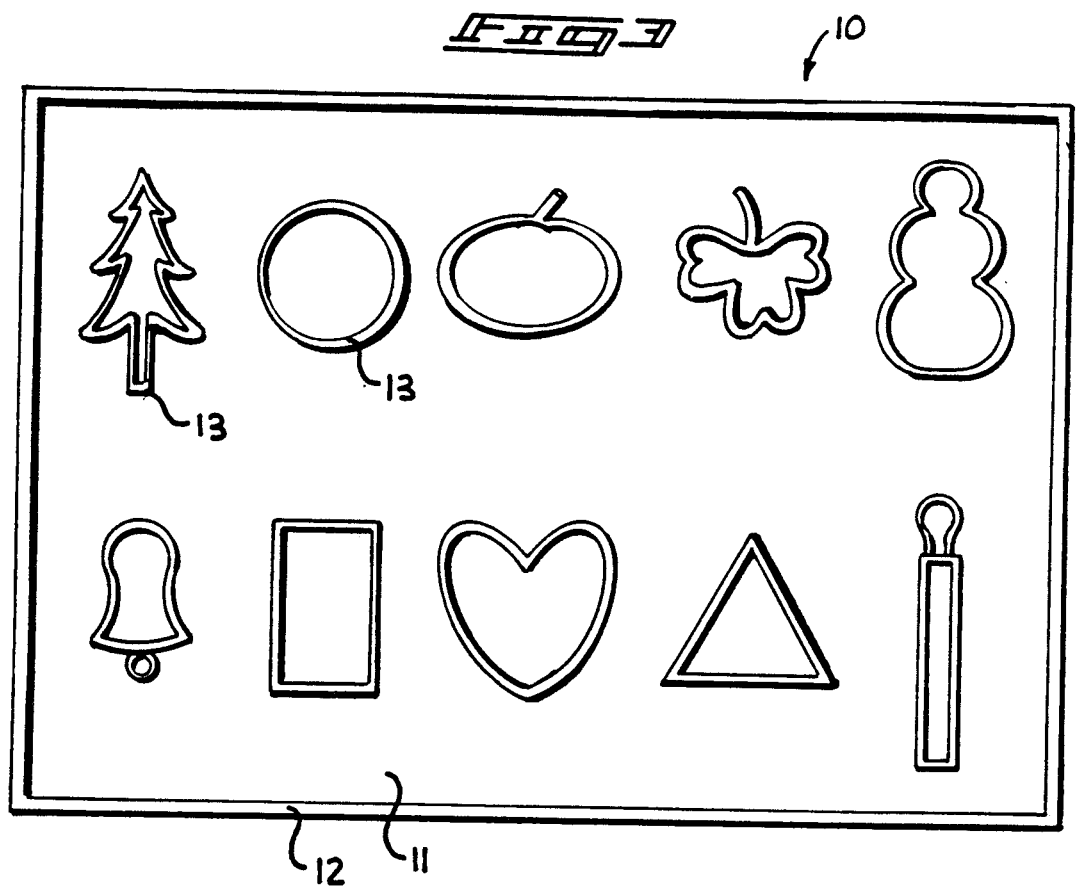
FIG. 3 is an orthographic view of the instant invention.

FIG. 1 illustrates a prior art cookie mold organization 1, wherein a pan 2 includes a matrix of molds 3 fixedly mounted within the pan, wherein clip members 4 are provided for ease of mounting of the organization subsequent to use, in a manner as set forth in U.S. Pat. No. 2,493,854. FIG. 2 illustrates the prior art of FIG. 1 utilizing variously configured mold members 3.

More specifically, the cookie baking apparatus 10 of the instant invention essentially comprises a planar metallic support plate 11, including a perimeter flange 12 directed upwardly relative to the plate 11 to define a baking area, wherein a plurality of mold members 13 defined by enclosed circuitous loops mounted and arranged orthogonally relative to the plate 11 are positioned about the upper surface of the plate 11 in a fixed relationship. In use of the organization set forth in FIG. 3, a cookie dough is positioned above the mold members 13, wherein a rolling of a conventional rolling pin and the like effects severing of the dough contained within the individual mold members 13, whereupon excess dough positioned within the plate 11 between the various mold members is removed and the organization positioned within an oven for conventional baking. Such a rolling procedure is set forth in U.S. Pat. No. 2,493,854 incorporated herein by reference.

Figure 4:
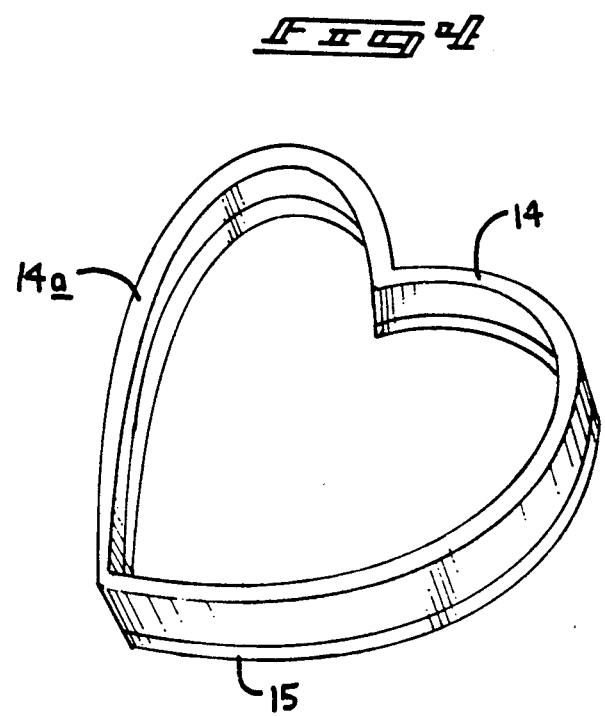
FIG. 4 is an isometric illustration of an individual mold utilized by the instant invention.

FIG. 4 illustrates the use of modified members 14 that include an upper cutting edge 14a, with a ferromagnetic base strip 15 continuosly affixed to a bottom continuous edge of each modified mold member 14 to permit the selective positioning of the modified mold members 14 about the metallic support plate 11 in a magnetically attracted relationship to permit individuals to utilize various selective shapes and maximize positioning of such shapes within the baking area of plate 11.

FIGS. 6–8 illustrate first and second molds utilized by the instant invention of a modified arrangement, wherein a top mold 16 includes a top plate 17 and a downwardly extending continuous skirt 18 formed about an exterior perimeter of the top plate. An injecting opening 19 is positioned medially of the top plate, with a continuous opening skirt 20 formed coextensively and coaxially of each opening 19. In use, a complementarily configured top mold 16, as well as modified molds 16a, are utilized. In this manner, an ejection of a first cookie dough product 21 defined by the top plate 17 and the skirt 18 and opening skirt 20 is utilized. A second cookie dough product 22 is formed that is ejected from the opening 18 and that is manually projected through the opening skirt 20 thereby forming a plurality of cookie products from each individual mold. Further, it should be noted that the molds 16 and 16a may also be provided with the ferromagnetic base strip 15 to enhance positioning of the mold to the support plate 11 during a dough severing procedure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cookie baking apparatus comprising, in combination, an elongated continuous planar metallic support plate, the metallic support plate including a perimeter flange extending peripherally about the support plate in a fixed relationship, and a plurality of mold members securable to the support plate for effecting severing of discrete cookie portions from a dough sheet, and wherein each of the mold members include a top plate, the top plate includes a downwardly extending continuous skirt orthogonally mounted to an outer periphery of the top plate, and a dough ejecting opening directed through the top plate medially thereof, and a continuous opening skirt fixedly and orthogonally mounted coextensively to the top plate to an inner periphery thereof defining the dough ejecting opening, wherein the opening skirt and the continuous skirt are of equal predetermined height, and wherein a lower terminal end of the continuous skirt includes a continuous ferromagnetic strip to enhance securement of the opening skirt to the support plate during a dough severing procedure.

* * * * *